United States Patent
Jenkins et al.

(10) Patent No.: US 11,146,515 B2
(45) Date of Patent: Oct. 12, 2021

(54) VISITOR INVITATION MANAGEMENT

(71) Applicant: INTERNATIONAL BUSINESS MACHINES CORPORATION, Armonk, NY (US)

(72) Inventors: Jana H. Jenkins, Raleigh, NC (US); Jeremy R. Fox, Georgetown, TX (US); Uri Kartoun, Cambridge, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

(21) Appl. No.: 16/352,941

(22) Filed: Mar. 14, 2019

(65) Prior Publication Data

US 2020/0296061 A1 Sep. 17, 2020

(51) Int. Cl.

| | |
|---|---|
| *H04L 12/58* | (2006.01) |
| *G06K 7/14* | (2006.01) |
| *G06F 40/30* | (2020.01) |
| *G06Q 10/10* | (2012.01) |

(52) U.S. Cl.
CPC ............ *H04L 51/08* (2013.01); *G06F 40/30* (2020.01); *G06K 7/1417* (2013.01); *G06Q 10/10* (2013.01); *G06Q 10/107* (2013.01)

(58) Field of Classification Search
CPC ........ H04L 51/08; G06F 40/30; G06K 7/1417
See application file for complete search history.

(56) References Cited

U.S. PATENT DOCUMENTS

| 8,629,755 | B2 | 1/2014 | Hashim-Waris | |
|---|---|---|---|---|
| 9,990,786 | B1* | 6/2018 | Ziraknejad | ............... G07C 9/27 |
| 2008/0059220 | A1* | 3/2008 | Roth | .................... G06Q 30/018 |
| | | | | 705/311 |
| 2009/0235280 | A1 | 9/2009 | Tannier | |
| 2010/0070877 | A1 | 3/2010 | Scott | |
| 2011/0106892 | A1* | 5/2011 | Nelson | ................. G06Q 10/109 |
| | | | | 709/206 |

(Continued)

OTHER PUBLICATIONS

"Expiring badges: Visitor badges are Valid today, but Void tomorrow", [online], visitorsolutions.com, Web Solutions, 2016-2018 Data Management, Inc., 5 pages, Retrieved from the Internet: <URL: https://www.visitorpasssolutions.com/Products/Expiring_Badges/>.

(Continued)

*Primary Examiner* — Tonia L Dollinger
*Assistant Examiner* — Joseph M Cousins
(74) *Attorney, Agent, or Firm* — Alexis N. Hatzis (57) ABSTRACT

A method, a computer system, and a computer program product for visitor invitation management are provided. The present invention may include determining that a first electronic message from a sender to a recipient contains invitation information. The present invention may include extracting the invitation information from the first message using one or more natural language processing (NLP) techniques. The present invention may also include generating a visitor badge based on the extracted invitation information. The present invention may lastly include sending a second electronic message to the recipient containing the generated visitor badge.

11 Claims, 6 Drawing Sheets

(56) References Cited

U.S. PATENT DOCUMENTS

| | | | | |
|---|---|---|---|---|
| 2011/0289010 | A1* | 11/2011 | Rankin, Jr. | G06Q 50/16 705/313 |
| 2012/0321060 | A1* | 12/2012 | Lucey | H04L 12/1818 379/93.21 |
| 2013/0049928 | A1 | 2/2013 | Moore | |
| 2013/0200994 | A1 | 8/2013 | Kannan | |
| 2014/0333412 | A1 | 11/2014 | Lewis | |
| 2015/0109104 | A1 | 4/2015 | Fadell | |
| 2015/0112885 | A1 | 4/2015 | Fadell | |
| 2017/0324751 | A1* | 11/2017 | Prabhu | H04W 12/06 |
| 2018/0139210 | A1* | 5/2018 | Gideon, III | G07C 9/27 |
| 2018/0232973 | A1* | 8/2018 | Teh | G07C 9/27 |
| 2019/0370615 | A1* | 12/2019 | Murphy | G06Q 10/0633 |
| 2019/0386949 | A1* | 12/2019 | Vennam | G06Q 10/109 |
| 2020/0184755 | A1* | 6/2020 | Gopalan | G06Q 10/06 |

OTHER PUBLICATIONS

"Integration of Visitor Management with Access Control Systems", EasyLobby White Paper, Integrated ID Systems, Inc, 6 pages.

"Keep Track of Visitors with Temporary Expiring visitor Badges", [online], 2004-2018 IDW, LLC, 4 pages, Retrieved from the Internet: <URL: https://www.idwholesaler.com/learning-center/temporary-visitor-badges/>.

"The Gateway to Stronger Security", [online], Threshold Visitor Management System, Visitor Badge, Software, Log Book, Sign-In, VMS, [retrieved on Mar. 13, 2019], 3 pages, Threshold (formerly Visitor Pass Solutions), Retrieved rom the Internet: <URL: https://www.thresholdsecurity.com/Default.asp?gclid=EAlalQobChMlpJfL0b6H2glVD7jACh0FJwpJEAMYASAAEgIdL_D_BwE>.

"We believe every person has the right to feel safe.", [online], visitorpasssolutions.com, Web Solutions, 2016-2018 Data Management, Inc., 5 pages, Retrieved from the Internet: <URL: https://www.visitorpasssolutions.com/?gclid=EAlalQobChMlpJfL0b6H2glVD7jACh0FJwpJEAMYASAAEgIdL_D_BwE>.

Mell et al., "The NIST Definition of Cloud Computing", National Institute of Standards and Technology, Special Publication 800-145, Sep. 2011, pp. 1-7.

Terschuren, "Mobile Visitor Management Systems a 'Win-Win' for Visitors and Security Staff", [online], SSi Staff, Dated: May 25, 2016, 3 pages, Retrieved from the Internet: <URL: https://www.securitysales.com/access/mobile_visitor_management_systems_a_win_win_for_visitors_and_security_staff/>.

* cited by examiner

FIG. 6

VISITOR INVITATION MANAGEMENT

BACKGROUND

The present invention relates generally to the field of computing, and more particularly to visitor systems.

A visitor approval process may be tedious and may require that a host obtain permission before a visitor of the host may enter a secured location. The permission may include, but may not be limited to, a verbal permission, a written permission, and/or a physical badge.

SUMMARY

Embodiments of the present invention disclose a method, a computer system, and a computer program product for visitor invitation management. The present invention may include determining that a first electronic message from a sender to a recipient contains invitation information. The present invention may include extracting the invitation information from the first message using one or more natural language processing (NLP) techniques. The present invention may also include generating a visitor badge based on the extracted invitation information. The present invention may lastly include sending a second electronic message to the recipient containing the generated visitor badge.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for visitor invitation management. As such, the present embodiment has the capacity to improve the technical field of visitor-related systems by automatically extracting information from an electronic message about a visitor's trip to a facility that requires formal access approval (e.g., a secured location), and further, by automatically generating a time-sensitive visitor badge by considering a date, a time, and a location of the visitor's visit. More specifically, the present invention may include determining that a first electronic message from a sender to a visitor (e.g., a recipient) contains invitation information. The present invention may include extracting the invitation information from the first message using one or more natural language processing (NLP) techniques. The present invention may also include generating a visitor badge based on the extracted invitation information. The present invention may lastly include sending a second electronic message to the visitor (e.g., the recipient) containing the generated visitor badge.

As described previously, a visitor approval process may be tedious and may require that a host obtain permission (e.g., formal access approval) before a visitor of the host may enter a secured location. The permission may include, but may not be limited to, a verbal permission, a written permission, and/or a physical badge. However, existing visitor approval systems may not extract pertinent date, time, and location information from an electronic message. Further, existing visitor approval systems may not create a visitor badge based on the extracted information.

Therefore, it may be advantageous to, among other things, extract metadata from an electronic message (e.g., an email) and create a visitor badge based on the extracted metadata.

According to at least one embodiment of the present invention, the visitor invitation management program may extract metadata from a calendar event sent to a user's email address and may create a visitor badge including date and time information extracted from the calendar event.

According to at least one embodiment of the present invention, the visitor invitation management program may automatically extract data and/or metadata about a visitor's trip to a facility which may require approval for authentication to access the facility.

According to at least one embodiment of the present invention, the visitor invitation management program may provide data and/or metadata extracted from an electronic message (e.g., an email) to a program which may generate a physical badge for the visitor, including a generated barcode and/or a quick response (QR) code.

According to at least one embodiment, the present invention may permit a user to specify details of a visitor's visit or to manually select a date of a visitor's visit using an interface of the visitor invitation management program.

According to at least one embodiment of the present invention, the visitor invitation management program may automatically generate a visitor badge by considering a date, a time, and a location of a visitor's visit, among other things.

According to at least one embodiment of the present invention, the visitor invitation management program may create a badge document, which may include an expiration date and/or time, and which may further include a barcode readable by a kiosk (e.g., a device equipped to read a barcode and/or a quick response [QR] code).

According to at least one embodiment, the present invention may generate an invitation without sending an electronic message to a visitor. In such an embodiment, the content of the electronic message may be processed either locally on the user's device or on a remote server and based on the processing of the electronic message (e.g., the invitation), one or more invitation messages may be sent to the visitors, which may, for example, include a quick response (QR) code.

According to at least one embodiment of the present invention, the visitor invitation management program may be a software component which may be utilized with a user's email client.

According to at least one embodiment of the present invention, the visitor invitation management program may send an electronic message (e.g., an email) that includes a barcode and/or QR code containing details of a visitor's visit to a secured location, including but not limited to an identification of the visitor and an organizer of the visit.

According to at least one embodiment of the present invention, the visitor invitation management program may create an updated barcode and/or QR code which may disqualify and override an outdated (e.g., expired) barcode and/or QR code. The visitor invitation management program may send the updated barcode and/or QR code via an electronic message (e.g., an email) to the visitor.

According to at least one embodiment of the present invention, the visitor invitation management program may automatically expire a visitor badge after a predefined visiting time ends.

According to at least one embodiment of the present invention, the visitor invitation management program may permit a user to invite multiple visitors by sending one electronic message (e.g., one e-mail). For example, if a user wishes to invite three visitors, Bob, Joe, and Kimberly, then for each visitor, a personal QR code may be generated based on information extracted from the electronic message (e.g., the email).

According to at least one embodiment of the present invention, the visitor invitation management program may permit a user to invite one or more visitors to visit a secured building on more than one occasion. For example, a user may invite a group of visitors for a workshop hosted at secured site (e.g., a secured location), such as the user's office building and/or another secured location, every Tuesday and Thursday in March 2019 between 9:00 a.m. and noon EST. By sending a single message to the one or more visitors, each visitor may receive a QR code that will permit the visitor to access the secured location during each of the one or more occasions. According to at least one other embodiment of the present invention, the one or more occasions may be hosted in different secured locations, and the visitor information management program may handle such scenarios by generating an appropriate QR code, containing details for each secured location and each of the respective time frames.

Figure 1:
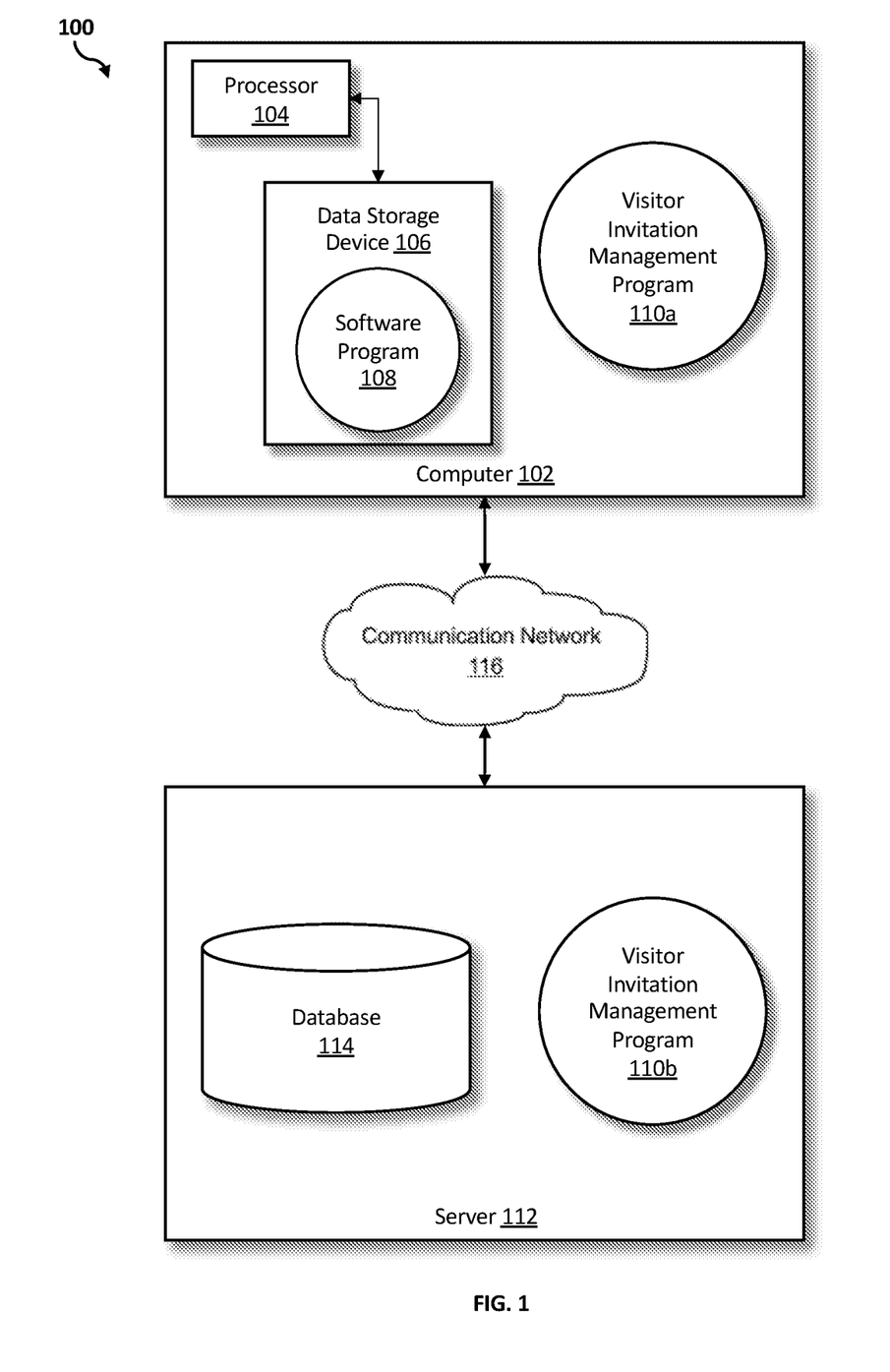
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a visitor invitation management program 110a. The networked computer environment 100 may also include a server 112 that is enabled to run a visitor invitation management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the visitor invitation management program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the visitor invitation management program 110a, 110b (respectively) to automatically extract data and/or metadata information about a visit which may require approval for authentication to access a secured location, and to generate a visitor badge based on the extracted data and/or metadata. The visitor invitation management method is explained in more detail below with respect to FIGS. 2 and 3.

Figure 2:
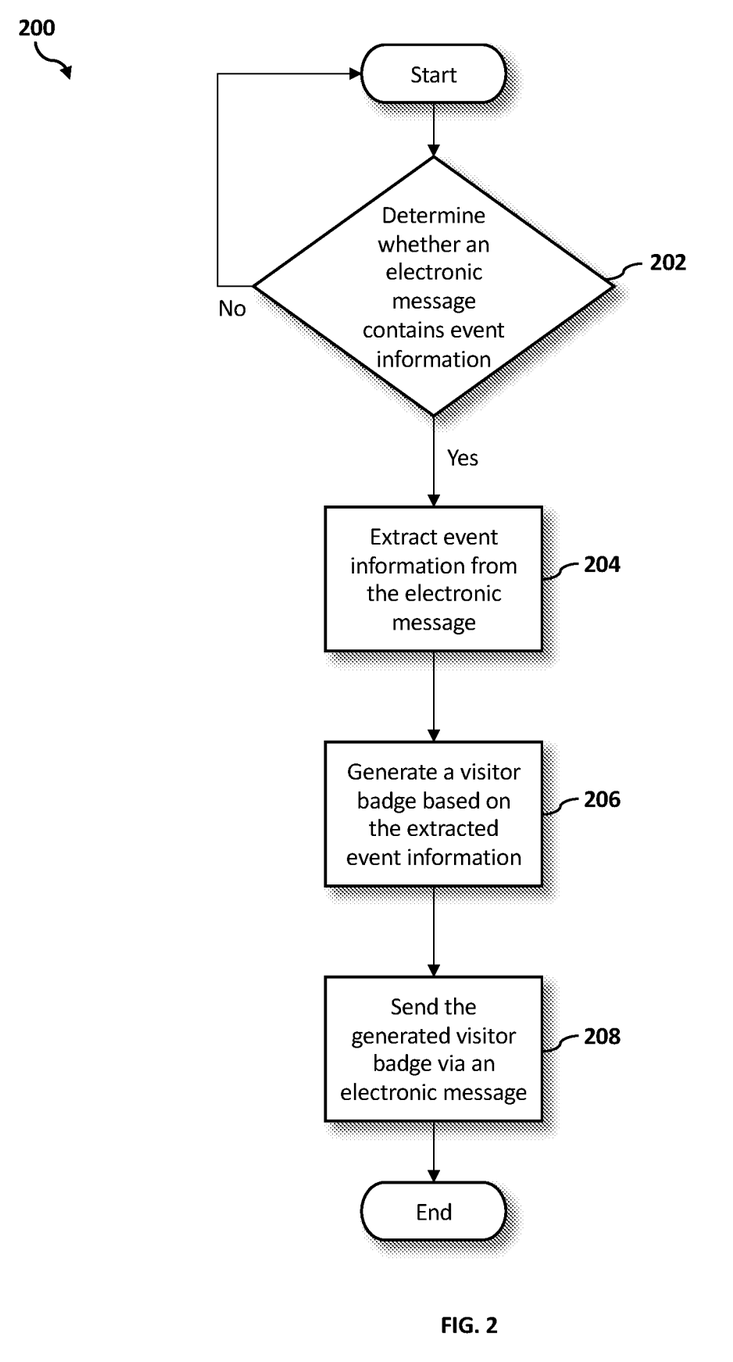
FIG. 2 is an operational flowchart illustrating a process for visitor invitation management according to at least one embodiment.

Referring now to FIG. 2, an operational flowchart illustrating the exemplary visitor invitation management process 200 used by the visitor invitation management program 110a and 110b according to at least one embodiment is depicted.

At 202, the visitor invitation management program 110a, 110b determines whether an electronic message (i.e., a first electronic message) from a user (i.e., a sender) to a visitor (i.e., a recipient) contains invitation (e.g., event) information. A determination as to whether an electronic message contains invitation information may be based on the detection of a keyword by the visitor invitation management program 110a, 110b.

The visitor invitation management program 110a, 110b may be integrated with a user's personal information management systems such as email, calendar, and instant messaging applications. The visitor invitation management program 110a, 110b may also be integrated with a user's social networking websites and/or applications.

The visitor invitation management program 110a, 110b may be trained by a text classification algorithm, using a set of keywords defined by a user, which may be used to evaluate whether a message on an integrated system (e.g., an email, a calendar invitation, an instant message, and/or a message on a social networking website or application) contains event (e.g., invitation) information. The set of keywords may be modifiable by the user based on pertinent details of an event and/or preferences of the user. For example, the visitor invitation management program 110*a*, 110*b* may be trained on "event information" (e.g., information which indicates that an event is taking place, and further, that a calendar invitation should be made) by receiving other event information as input to the system and by building a repertoire of event information (e.g., a database such as database 114 of event information). Once the visitor invitation management program 110*a*, 110*b* has been trained on event information, a newly inputted piece of event information may be classified as such by comparing the inputted event information to previously classified, similarly appearing, event information, which may be contained within the database of event information (e.g., database 114). The same may be done for non-event related information to ensure that non-event related information is not classified as event information, and further, that calendar invitations are not made for non-events.

The visitor invitation management program 110*a*, 110*b* may be prepopulated with event keywords which may be used to evaluate whether an electronic message contains event (e.g., invitation) information.

The visitor invitation management program 110*a*, 110*b* may, for example, use natural language processing (NLP) techniques to extract a visitor's (e.g., an event attendee's) profile information (i.e., a visitor profile or recipient profile) along with a date (i.e., a visit date), a time (i.e., a visit time), and a location (i.e., a visit location) of the visitor's visit.

Furthermore, the visitor invitation management program 110*a*, 110*b* may associate the text used in an electronic message with additional context information which may be retrieved from the visitor's email address and/or profile. This may include a visitor's work address, a visitor's home address, a visitor's work telephone number, and a visitor's home telephone number, among other things. Context information may be used to identify the meaning of a shorthand building name, for example, based on a user's work address and/or other contextual information.

For example, Dan integrates the visitor invitation management program 110*a*, 110*b* with his personal information management systems, including his email account, his calendar, and his instant messaging service. After integrating the systems, Dan begins typing an email to Lucy to set up a meeting to go over a joint presentation they have been working on. Dan realizes that it would be much easier to discuss the material in person, so he proposes to Lucy a meeting from 10 a.m. to 12 p.m. EST at his office location, 26 Diane Lane, Floor 90, New York, N.Y., 10006.

Since Dan has already integrated the visitor invitation management program 110*a*, 110*b* with his personal email account, the visitor invitation management program 110*a*, 110*b* uses the method described above to determine that the email contains event information.

At 204, the visitor invitation management program 110*a*, 110*b* extracts event information from the electronic message. The visitor invitation management program 110*a*, 110*b* may utilize natural language processing (NLP) techniques to extract data and/or metadata from an electronic message, including but not limited to a visitor's profile information and a date, a time, and/or a location of the visitor's visit. The metadata may include, for example, information that identifies the source and target of, and information that characterizes, the data to be transmitted.

The visitor invitation management program 110*a*, 110*b* may determine the event information to extract from an electronic message by utilizing a database of event keywords (e.g., event information), as described previously with respect to step 202 above. Event keywords may include, but may not be limited to, "meeting," "appointment," "a.m.," "p.m.," "A.M.," "P.M.," "January," "February," "March," "April," "May," "June," "July," "August," "September," "October," "November," "December."

The natural language processing (NLP) techniques, such as Watson™ (Watson and all Watson-based trademarks are trademarks or registered trademarks of International Business Machines Corporation in the United States, and/or other countries) techniques, used by the visitor invitation management program 110*a*, 110*b* may include, for example, a natural language classifier API (e.g., Watson™ Natural Language Classifier API).

Using a natural language classifier API, such as Watson™ Natural Language Classifier API, words in an electronic message may be analyzed to determine whether event (e.g., invitation) information is disclosed. During an analysis of the electronic message, the Watson™ Natural Language Classifier API may also consider the use of punctuation, including exclamation marks and question marks, as well as capital letters, to signify that an event (e.g., a meeting and/or an appointment, among other events) is intended.

The visitor invitation management program 110*a*, 110*b* may also utilize publicly available information (e.g., from the Internet or from another publicly available source), including a building guideline, to determine whether additional information (e.g., a driver's license, a passport, and/or another form of identification) may be required in order for a visitor to enter a secured location (e.g., a secured facility, a secured meeting room, and/or a secured building, among other secured locations). In an embodiment, the visitor invitation management program 110*a*, 110*b* may extract information for determining whether particular artifacts that a user may carry are not permitted at a secured location, e.g., a camera, and may alert the user to not to carry the artifact to the location.

Continuing with the above example, the visitor invitation management program 110*a*, 110*b* extracts the relevant event information from Dan's electronic message (e.g., the email) to Lucy. As described previously with respect to step 202 above, the visitor invitation management program 110*a*, 110*b* compares Dan's message to words contained within an event information database (e.g., database 114) to determine which information to extract.

Based on the contents of Dan's email, the visitor invitation management program 110*a*, 110*b* extracts the time of Dan's proposed meeting with Lucy: 10 a.m. to 12 p.m. EST, and the address of Dan's office: 26 Diane Lane, Floor 90, New York, N.Y., 10006.

At 206, the visitor invitation management program 110*a*, 110*b* generates a visitor badge based on the extracted information. The visitor invitation management program 110*a*, 110*b* may create a badge that contains a visitor name, a date of the visitor's visit, a time of the visitor's visit (i.e., a valid begin time and a valid end time), and a location of the visitor's visit based on data and/or metadata extracted from the electronic message (e.g., the email).

A visitor badge may be generated based on contents of an electronic message (e.g., an email, a calendar invitation, and/or an instant chat message, among other electronic messages). A visitor badge may include a time that the visitor will arrive at the secured location, an individual that the visitor will meet with, a purpose for the visitor's visit, and/or a time that the visitor is expected to leave the secured location.

A visitor badge may be generated as a portable document format (pdf) file or may be embedded as an image file within an electronic message. If a pdf file is used, technologies such as optical character recognition (OCR) may be used to convert the image file to text, if need be.

A visitor badge may contain a barcode and/or a quick response (QR) code which may expire automatically when a predefined event date and/or event time expires. Alternatively, a barcode and/or a QR code sent to a visitor may be terminated by a user (e.g., a host) at any time. A barcode and/or a QR code may increase an efficiency of the visitor's visit as an employee of the secured location (e.g., an officer, an operator, and/or a security guard, among other employees) may quickly scan the visitor badge instead of requesting a significant amount of information at the time of the visitor's visit.

A QR code may be an image that contains a block of data (e.g., credentials) which may be specified by the visitor invitation management program 110a, 110b. A QR code may contain information, such as a date, a time, and a location of a visitor's visit to a secured location. A QR code may be scannable by an employee (e.g., an officer, an operator, a security guard) of the secured location and may enable the visitor access to the secured location based on the credentials provided by the visitor invitation management program 110a, 110b.

Alternatively, as described previously, a barcode may be used in place of a QR code on a visitor badge. A barcode may be an optical, machine-readable representation of data which may be readable by a scanner and/or other electronic device. As with the QR code, a barcode may contain information, such as a date, a time, and a location of a visitor's visit to a secured location. A barcode may also be scannable by an employee (e.g., an officer, an operator, a security guard) of the secured location and may enable the visitor access to the secured location based on the credentials provided by the visitor invitation management program 110a, 110b.

Continuing with the above example, the visitor invitation management program 110a, 110b generates a QR code containing all of the information Lucy needs for her visit. The QR code is included on a visitor badge generated for Lucy.

When Lucy arrives at Dan's office, the security guard at the front desk will be able to scan the QR code included on Lucy's badge. This will permit her access to the secured location.

Further, the QR code will expire at 12 p.m., which was the meeting end time indicated by Dan in his email. At this time, if Lucy leaves the secured location within Dan's office building, she will not be able to regain access to the secured location without a renewal of her secured credentials.

At 208, the visitor invitation management program 110a, 110b sends the generated visitor badge via an electronic message (i.e., a second electronic message). An electronic message (e.g., an email) may be sent to the visitor which may include the badge generated by the visitor invitation management program 110a, 110b. A visitor badge may be printed by the user and/or may be an electronic badge accessed by the user's smartphone and/or tablet.

Continuing with the above example, Lucy receives the generated visitor badge via an email from Dan's email address. She prints the visitor badge and also adds an electronic copy to the mobile wallet on her smartphone. Lucy will be able to gain access to Dan's office by scanning either copy of the generated code.

Figure 3:
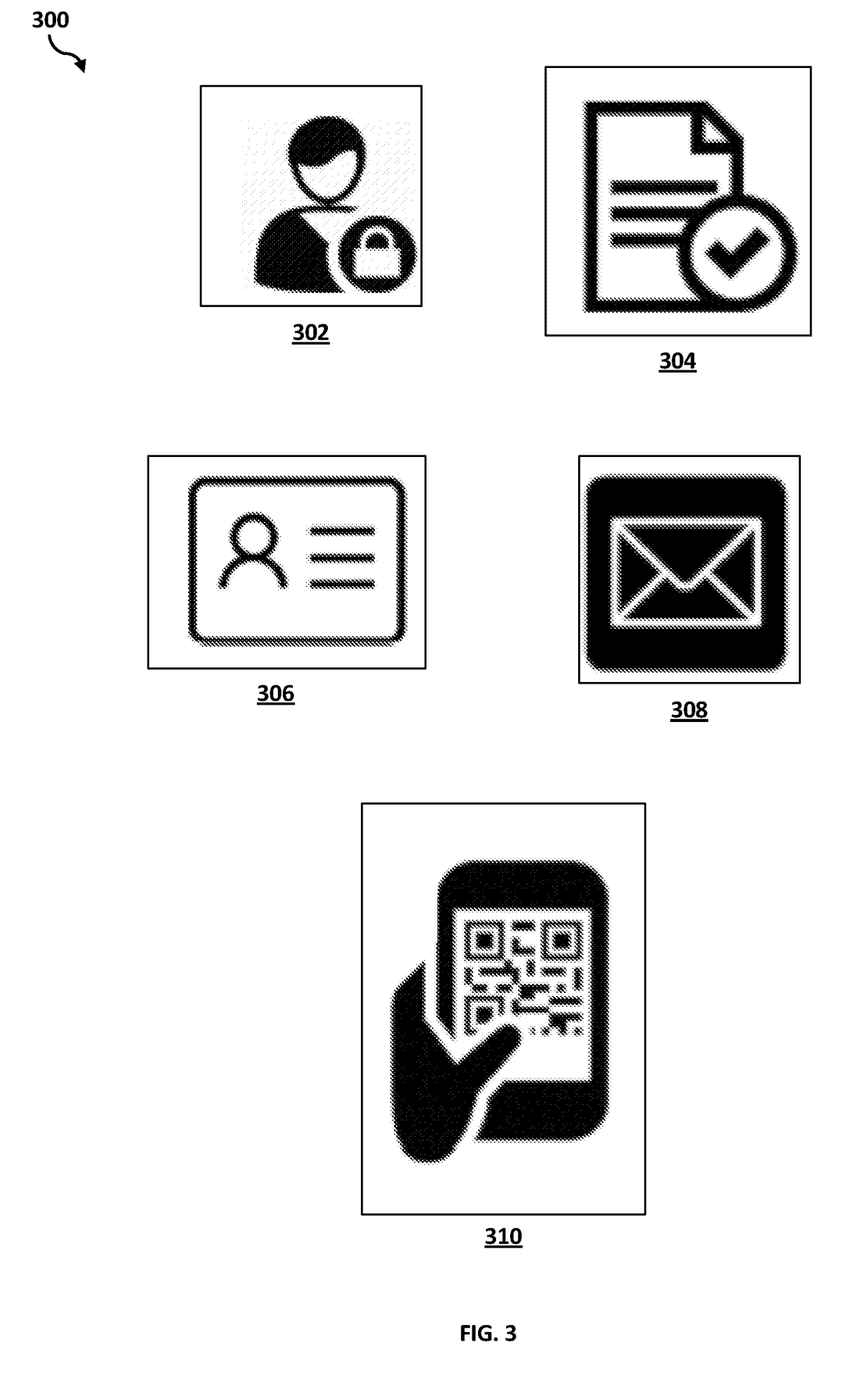
FIG. 3 is a block diagram of the visitor invitation management program according to at least one embodiment.

Referring now to FIG. 3, a block diagram 300 of the visitor invitation management program according to at least one embodiment is depicted. As described previously with respect to step 202 above, the visitor invitation management program 110a, 110b is integrated with a user's personal information management systems 302, including but not limited to email, calendar, instant messaging and/or social networking websites.

The visitor invitation management program 110a, 110b determines whether an electronic message 304 contains event information. As described previously with respect to step 204 above, the visitor invitation management program 110a, 110b uses natural language processing (NLP) techniques to extract event (e.g., invitation) information from the electronic message.

As described previously with respect to step 206 above, the visitor invitation management program 110a, 110b generates a visitor badge 306 based on the extracted information. For example, as described previously with respect to Lucy's visit to the secured location, the visitor badge may include a time frame of the visitor's visit as well as an address for the secured location. Once the visitor invitation management program 110a, 110b generates the visitor badge, the visitor badge may be sent to the visitor via an electronic message 308, as described previously with respect to step 208 above.

The visitor badge may include a QR code 310 which may be used to gain access to the secured location.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
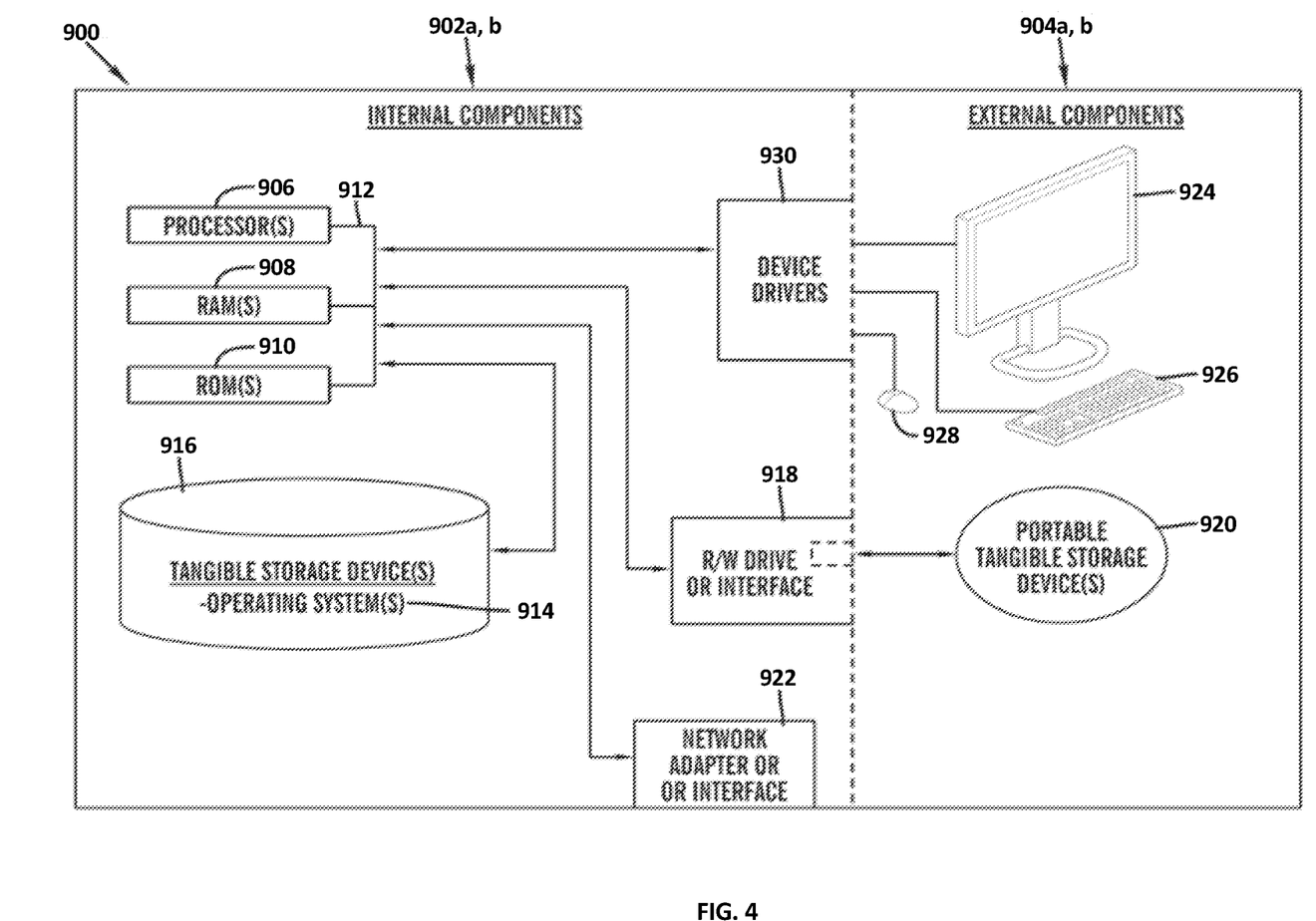
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the visitor invitation management program 110a in client computer 102, and the visitor invitation management program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the visitor invitation management program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the visitor invitation management program 110a in client computer 102 and the visitor invitation management program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the visitor invitation management program 110a in client computer 102 and the visitor invitation management program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
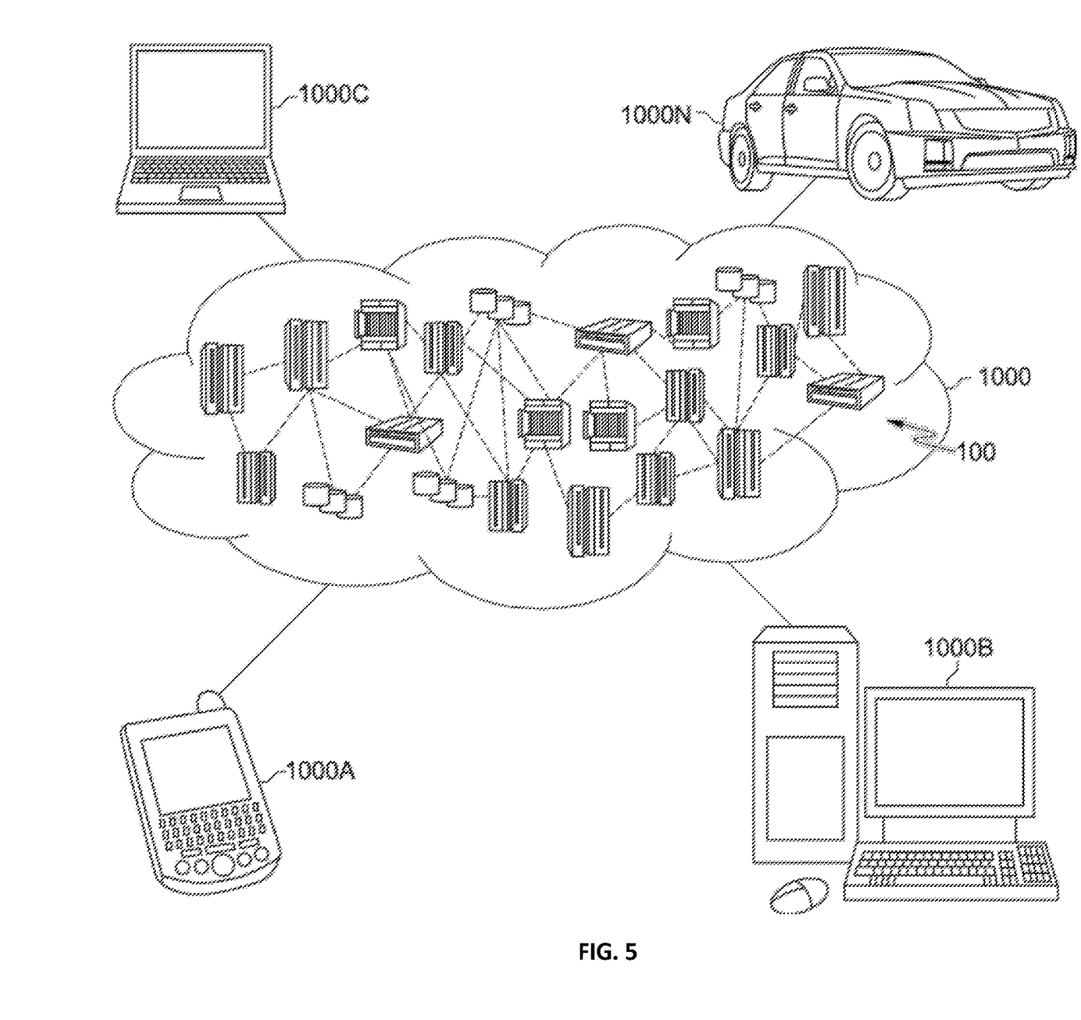
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
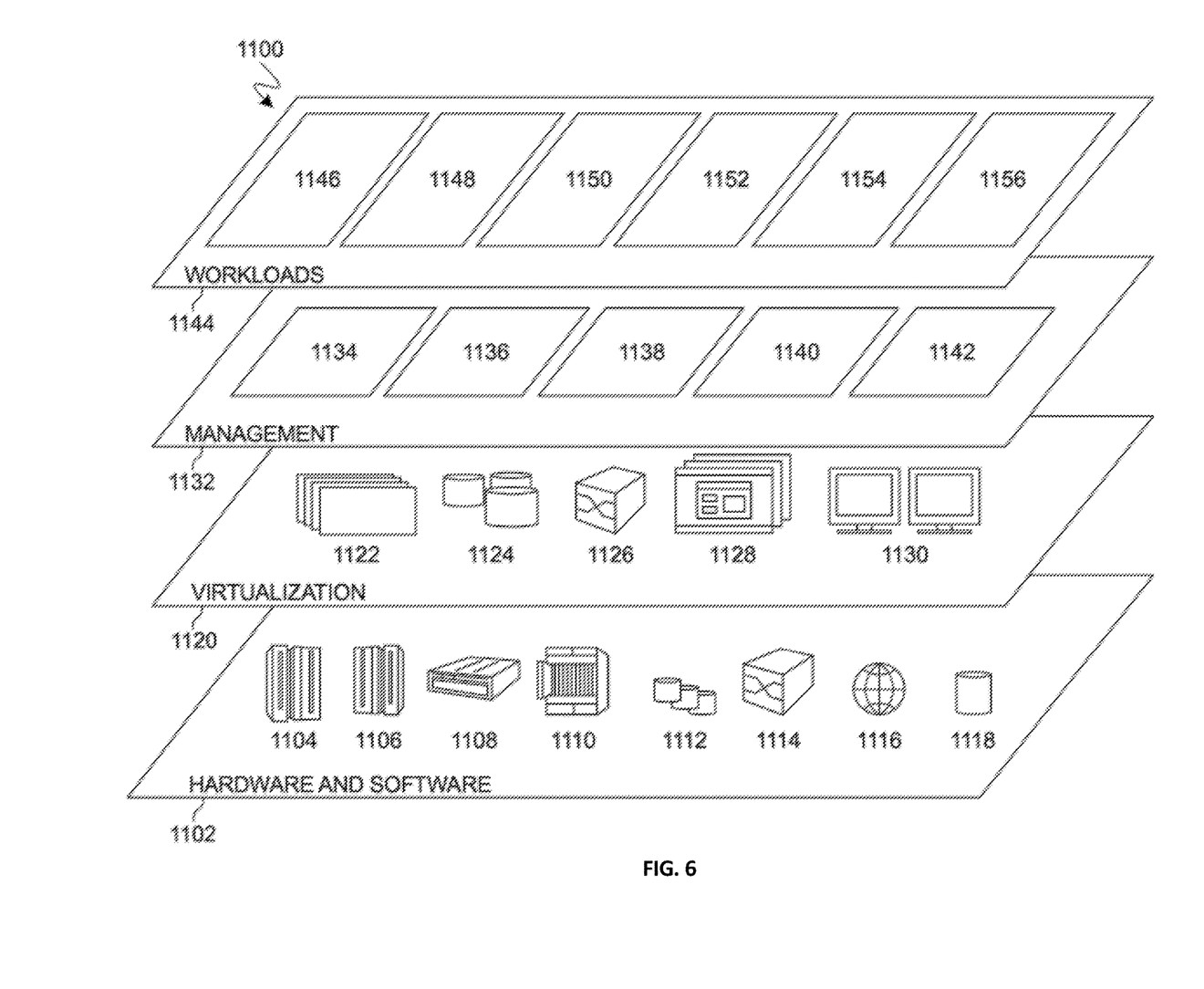
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provides pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and visitor invitation management 1156. A visitor invitation management program 110a, 110b provides a way to automatically extract data and/or metadata information about a visit which may require approval for authentication to access a secured location, and generate a visitor badge based on the extracted data and/or metadata.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for visitor invitation management, the computer-implemented method comprising:

determining that a first electronic message from a sender to a recipient contains invitation information by using a text classification algorithm based on keywords, wherein the invitation information comprises a visit date, a visit time, a visit location, and a visitor profile;

extracting the invitation information from the first message using one or more natural language processing (NLP) techniques;

retrieving a plurality of visitor context information from the first electronic message, wherein the visitor context information is visitor-specific information retrieved from the visitor's email address;

generating a visitor badge, which is specific to the recipient, including the extracted invitation information and the retrieved plurality of visitor context information;

extracting a building guideline from a publicly available source, wherein the building guideline is an identification requirement for visitors or a prohibition of artifacts visitors carry within the visit location;

including the extracted building guideline on the visitor badge; and sending a second electronic message to the recipient containing the generated visitor badge.

2. The computer-implemented method of claim 1, wherein the visitor badge includes a valid begin time and a valid end time.

3. The computer-implemented method of claim 2, wherein the visitor badge automatically expires at the valid end time.

4. The computer-implemented method of claim 3, wherein the visitor badge includes a personal quick response (QR) code.

5. A computer program product for visitor invitation management, comprising:
one or more computer-readable tangible storage media and program instructions stored on at least one of the one or more computer-readable tangible storage media, the program instructions executable by a processor to cause the processor to perform a method comprising:
determining that a first electronic message from a sender to a recipient contains invitation information by using a text classification algorithm based on keywords, wherein the invitation information comprises a visit date, a visit time, a visit location, and a visitor profile;
extracting the invitation information from the first message using one or more natural language processing (NLP) techniques;
retrieving a plurality of visitor context information from the first electronic message, wherein the visitor context information is visitor-specific information retrieved from the visitor's profile;
generating a visitor badge, which is specific to the recipient, including the extracted invitation information and the retrieved plurality of visitor context information;
extracting a building guideline from a publicly available source, wherein the building guideline is an identification requirement for visitors or a prohibition of artifacts visitors carry within the visit location;
including the extracted building guideline on the visitor badge; and
sending a second electronic message to the recipient containing the generated visitor badge.

6. The computer program product of claim 5, wherein the visitor badge includes a valid begin time and a valid end time.

7. The computer program product of claim 6, wherein the visitor badge automatically expires at the valid end time.

8. A computer system for visitor invitation management, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
determining that a first electronic message from a sender to a recipient contains invitation information by using a text classification algorithm based on keywords, wherein the invitation information comprises a visit date, a visit time, a visit location, and a visitor profile;
extracting the invitation information from the first message using one or more natural language processing (NLP) techniques;
retrieving a plurality of visitor context information from the first electronic message, wherein the visitor context information is visitor-specific information retrieved from the visitor's email address;
generating a visitor badge, which is specific to the recipient, including the extracted invitation information and the retrieved plurality of visitor context information;
extracting a building guideline from a publicly available source, wherein the building guideline is an identification requirement for visitors or a prohibition of artifacts visitors carry within the visit location;
including the extracted building guideline on the visitor badge; and
sending a second electronic message to the recipient containing the generated visitor badge.

9. The computer system of claim 8, wherein the visitor badge includes a valid begin time and a valid end time.

10. The computer system of claim 9, wherein the visitor badge automatically expires at the valid end time.

11. The computer system of claim 10, wherein the visitor badge includes a personal quick response (QR) code.

* * * * *